United States Patent [19]

Smith

[11]  4,252,671

[45]  Feb. 24, 1981

[54] PREPARATION OF COLLOIDAL IRON DISPERSIONS BY THE POLYMER-CATALYZED DECOMPOSITION OF IRON CARBONYL AND IRON ORGANOCARBONYL COMPOUNDS

[75] Inventor: Thomas W. Smith, Penfield, N.Y.

[73] Assignee: Xerox Corporation, Stamford, Conn.

[21] Appl. No.: 100,304

[22] Filed: Dec. 4, 1979

[51] Int. Cl.³ .......................... B01J 31/02; C08K 3/08
[52] U.S. Cl. ................................ 252/430; 260/42.22;
430/286; 430/945; 568/451; 568/454; 568/455
[58] Field of Search ...................... 260/604 HF, 42.22;
252/430; 430/945, 286

[56] References Cited

U.S. PATENT DOCUMENTS

| | | | |
|---|---|---|---|
| 3,228,881 | 1/1966 | Thomas | 260/39 M |
| 3,281,344 | 10/1966 | Thomas | 260/42.22 |
| 3,636,159 | 1/1972 | Solomon | 260/604 HF |
| 3,998,864 | 12/1976 | Trevillyan | 260/604 HF |

*Primary Examiner*—John F. Niebling
*Attorney, Agent, or Firm*—H. M. Brownrout; E. O. Palazzo; P. P. Eichler

[57]  ABSTRACT

There is disclosed a method for the preparation of a homogeneous, physically stable colloidal elemental iron dispersion of colloidal iron particles having a size in the range of from about 10 Angstrom units to about 200 Angstrom units. The method comprises preparing a solution of an active polymer in an inert solvent, and incrementally adding thereto an iron precursor, at a temperature at which the iron precursor will become bound to the active polymer and thermally decompose to produce elemental iron particles, the process being carried out in an inert atmosphere. Such dispersions may be used per se as catalysts, or may be used for the preparation of supported colloidal iron catalysts. The dispersions may also be used for the preparation of ablative optical recording media, and for the preparation of magnetic xerographic developer materials.

41 Claims, No Drawings

PREPARATION OF COLLOIDAL IRON DISPERSIONS BY THE POLYMER-CATALYZED DECOMPOSITION OF IRON CARBONYL AND IRON ORGANOCARBONYL COMPOUNDS

The present invention relates to a novel method for the preparation of homogeneous colloidal elemental iron dispersions, with the use of an active polymer in dilute solution in any of a large variety of suitable inert solvents, and with the use of any of a large variety of suitable iron precursors. The invention also relates to the homogeneous colloidal elemental iron dispersions, to their use as catalysts and for the preparation of supported iron catalysts, to their use as materials useful for the preparation of ablative optical recording media, and to their use in the preparation of magnetic xerographic developer materials.

In general, the preparation of the homogeneous colloidal elemental iron dispersions of the invention involves the thermal decomposition of a suitable iron precursor in a relatively dilute solution of an active polymer in an inert solvent for the iron precursor and the active polymer, the reaction being carried out in an inert atmosphere, with the thermal decomposition of the iron precursor occurring primarily with the precursor bound to the active polymer. The term "active polymer" as used herein and defined more particularly hereinafter refers generally to polymer molecules substantially each of which contain at least one reactive binding site for the iron precursor, at which sites the iron precursor molecules react directly and spontaneously to produce polymer-bound iron precursor. Such polymers are to be distinguished from "passive polymers" in that systems for the preparation of colloidal iron dispersions employing a passive polymer in solution require sufficient heat to remove at least one ligand from the iron precursor molecule before the iron precursor can become bound to the polymer; that is, the iron precursor molecules cannot react directly and spontaneously at the binding sites of the passive polymer. Preferably, the appropriate amount of the desired active polymer is dissolved in the appropriate amount of the desired inert solvent, and the solution is heated to the appropriate reaction temperature at which thermal decomposition of the polymer-bound iron precursor will occur, whereupon the appropriate amount of the desired iron precursor is added in appropriate increments and binds to the active polymer. This incremental addition is continued until the appropriate total amount of iron precursor has been added and permitted to thermally decompose.

Depending upon the choice of inert solvent, active polymer, iron precursor, and the preparative conditions, the homogeneous colloidal iron dispersions of the invention may contain colloidal iron particles having an overall size range of from about 10 Angstrom units to about 200 Angstrom units. Usually, however, the materials and conditions are selected such that any given dispersion produced will inherently have a relatively narrow particle size range within the overall range of from about 10 Angstrom units to about 200 Angstrom units, the materials and conditions being selected to produce a particle size range suitable for the intended end use of the dispersion. As a practical upper limit, the particle size is typically about 200 Angstrom units, since colloidal iron dispersions according to the invention having such a maximum particle size are typically very physically stable; that is, they do not settle in periods of years. If the colloidal iron particle size substantially exceeds about 200 Angstrom units, the dispersions tend to lack physical stability and may flocculate. The minimum particle size observed is about 10 Angstrom units. The maximum particle size observed is about 200 Angstrom units. Dispersions having a maximum particle size of about 150 Angstrom units have the best physical stability. The colloidal iron dispersions according to the invention are also very chemically stable if kept in an inert environment such as argon. Extensive oxidation of the iron particles will occur readily in the presence of oxygen. Preferably, under some circumstances, it is desired to regulate the conditions such that the maximum particle size is no greater than about 120 Angstrom units, colloidal iron dispersions having such a maximum particle size typically being superparamagnetic. Dispersions having a maximum particle size between about 120 Angstrom units and about 200 Angstrom units show a weak time-dependent ferromagnetism which leads to magnetic chaining of the particles, which can, but does not necessarily, lead to agglomeration and precipitation of the particles.

Considering the possible catalytic utilities of the colloidal iron dispersions of the instant invention, it is known that the catalytic activity of colloidal iron particles is usually inversely proportional to the size of the particles. Accordingly, the most efficient particle size for catalytic use may be in the minimum size range. There are, however, two features of the use of the dispersions of this invention as catalysts which outweight simple considerations of particle size in the efficiency of the catalyst. This invention provides a method for the preparation of independent unsupported colloidal particles of controlled narrow particle size distribution. These dispersions can subsequently be immobilized in an appropriate solid phase to yield a solid catalyst which contains a high loading of colloidal catalytic particles. In processes where the colloidal particles are generated in situ, i.e., on the support, by reduction of absorbed ions, high percentages of catalyst loading cannot be achieved while maintaining a small particle size and a narrow particle size distribution. The most important feature of the catalytic activity of the dispersions of this invention is the role of the polymer bound to the particles' surfaces. In the presence of reducing gases, the functional sites on the polymer can react with the iron atoms to generate the active catalytic species in a liquidous layer surrounding the particle. The colloidal iron dispersions may not only be used as catalysts per se; they may also be supported in a suitable solid support. Various reactions which may be catalyzed by the colloidal iron of the instant invention include hydroformylation reactions, oxidative coupling, and hydrogenation of alkenes.

For the preparation of ablative optical recording media, it is preferred generally to maximize the particle size up to about 120 Angstrom units, so that the superparamagnetic properties are present, and it is also desirable to maximize the ratio of colloidal iron to the active polymer, which may be accomplished by minimizing the amount of polymer and maximizing the amount of iron precursor during the incremental addition of the iron precursor. The basic reason for this is to maximize the light absorptivity of the oxidized iron films. Ablative optical recording media which may be prepared from colloidal iron dispersions according to the instant invention are described in copending U.S. patent application Ser. No. 054,204, filed July 2, 1979. entitled "Optical Disk", which application is assigned to the assignee of the instant application.

As already mentioned, the superparamagnetic iron dispersions of the present invention, that is, those dispersions having a particle size of about 120 Angstrom units or less may also be utilized in the preparation of superparamagnetic xerographic developer materials. Indeed, for utility in the preparation of ferromagnetic xerographic developer materials, for example, it has been found quite suitable to utilize colloidal iron dispersions according to the invention having particle sizes up to about 200 Angstrom units.

Considering the method of producing homogeneous colloidal iron dispersions according to the invention in greater detail, a suitable solvent is required which will dissolve the active polymer and the iron precursor, and the iron precursor becomes bound to the active sites of the polymer, where the iron precursor tends to decompose at a rate which is greatly in excess of the rate of any decomposition which may occur in respect of unbound iron precursor molecules in solution in the solvent.

Considering suitable active polymers in greater detail, it has already been indicated that a suitable active polymer is any polymer which contains one or more active sites which will react spontaneously, directly and rapidly with the iron precursor molecules themselves to yield polymer-bound iron precursor molecules. It is highly preferred that this binding occur much more rapidly than any substantial decomposition of unbound iron precursor molecules remaining dissolved in the solvent. It is also highly preferred that the polymer-bound iron precursor decomposes at a much more rapid rate than the unbound iron precursor. This insures that the iron particles will be generated primarily in the domain of the polymer molecules.

The ratio of active polymer to the amount of solvent employed is important. The concentration of the polymer must be below the critical entanglement concentration for the polymer molecules in solution, that is, each polymer molecule constitutes a discrete entity. Each such discrete polymer molecule may be referred to as an isolated domain. The lower the molecular weight of the polymer, the higher the critical entanglement concentration for the polymer, thus the greater the amount of polymer which can be used for a given volume of solvent.

As will be seen from the examples which follow, the iron precursor is preferably added in increments, so that a predetermined excess of dissolved, polymer-unbound iron precursor is present in solution. The mechanism and general sequence of events in the reaction mixture is somewhat as follows. When a relatively small increment of iron precursor is added to a solution of the active polymer at an appropriate temperature, the active polymer first serves as a reactant, and the iron precursor molecules become bound to the active sites of the active polymer. This reaction preceeds nucleation, wherein a particle nucleus is formed which may either be iron or some more complex iron-containing species. Thus, at the outset of the entire sequence of events, the active polymer is a catalyst for the generation of iron particle nuclei or iron-containing particle nuclei, which are bound to the active sites of the polymer. At this point, the polymer has served its catalytic role for the nucleation of particles, and the reaction vessel contains randomly dispersed colloidal nuclei of iron or iron-containing particles bound to the active sites of the polymer. At nucleation, the decomposition becomes dominated by a new process, viz., disproportionation of iron precursor at the surfaces of the nuclei. The polymer stabilizes the nascent (growing) particles in the same domains in which the particles were nucleated, that is, collisional growth of the nascent particles is minimized. The principle role of the polymer now becomes stabilization of the newly formed colloidal iron system. Now, the reaction merely enlarges the particles as more iron precursor is added incrementally and reacts at the surface of the polymer-bound particles. There is a distinct transformation from the particle nucleation stage to the particle growth stage, evidenced by a dramatic change in the rate of evolution of carbon monoxide.

The number of polymer molecules, i.e., discrete polymer molecule domains, is directly proportional to the number of iron particles and inversely proportional to the iron particle size at any given volume of iron.

Suitable active polymers must, of course, be soluble in the solvent selected, preferably at about ambient temperature or slightly above for convenience, but in any event, necessarily at the temperature at which the iron precursor binding and iron precursor decomposition occur to produce colloidal iron particles. Numerous active polymers may be used in the method of the instant invention. Generally, the active polymers which are useful are Lewis bases. Such would include polymers bearing nucleophilic atoms or groups in the backbone or appendant thereto. One specific class of useful Lewis bases are polymers which contain nitrogen having a free non-bonding electron pair, these being termed, for convenience, nitrogen-containing Lewis bases. Typical active polymers of this type are vinyl polymers containing amine, amide, nitrile, oxime or imine groups. Typical examples of nitrogen-containing Lewis base active polymers are copolymers of (1) styrene, ethylene, butadiene, or derivatives thereof, with (2) acrylonitrile, acrylamide, N,N-dialkylacrylamides, vinylamine, and aromatic and aliphatic polyamides. Other Lewis bases which may not be of the nitrogen-containing nucleophilic type, but which are useful, are Lewis bases containing oxygen, phosphorous or sulfur. Typical of such other nucleophilic Lewis base active polymers are polymers containing amine oxide, phosphine oxide or sulfoxide residues. Specific examples of such materials are styryl diphenylphosphine oxide, vinylpyridine-N-oxide, and poly(phenylenesulfoxide).

Turning now to a consideration of suitable iron precursors, such are labile iron carbonyl and iron organocarbonyl compounds. In referring to such compounds, the term "labile" as used herein is intended to signify that the iron in the compound is attached to a group which will readily become dissociated from the molecule to leave elemental iron. An important feature of the labile iron precursor is the nature of its labile ligands. It is highly preferred that the ligands be volatile or otherwise easily removable from the reaction mixture. It is essential that the ligands do not interfere with or adversely affect the decomposition process and the stability of the resultant dispersion. Specific classes of such compounds are iron carbonyls, iron alkylcarbonyls, iron alkenylcarbonyls, and iron nitrosyls. One specific class of such suitable iron precursors are iron carbonyls such as iron pentacarbonyl, diiron nonacarbonyl and triiron dodecacarbonyl. Iron pentacarbonyl is one especially preferred material, for reasons of low cost and ready availability. The other two iron carbonyls mentioned are also preferred materials, being readily prepared from iron pentacarbonyl and being commonly commercially available. A second class of suitable iron precursors, as mentioned, are iron alkylcarbonyls such as the alkyltetracarbonyl iron compounds, for example, methyltetracarbonyl iron, which may be prepared by methods disclosed in the literature. A third class, as mentioned, are iron alkenylcarbonyls, of which there are a large number, all of them being commercially available or readily prepared by conventional methods taught in the literature. A list of some specific useful iron alkenylcarbonyls includes:

(Butadiene)Fe(CO)$_3$
(Octafluorocyclohexa-1,3-diene)Fe(CO)$_3$
(1,1'-Bicyclohexenyl)Fe(CO)$_3$
(Cycloheptatriene)Fe(CO)$_3$
(Cyclooctatetraene)Fe(CO)$_3$
Cyclopentadienyl)Fe(CO)$_3$
([2,2,1]-Bicycloheptadiene)Fe(CO)$_3$
(8,9-Dihydroindene)Fe(CO)$_3$
(Hexatriene)$_2$Fe(CO)$_3$
(Tetraphenylallene)Fe(CO)$_3$
(1-Methylallyl)FeCl(CO)$_3$
(Allyl)FeCl(CO)$_3$
(2-Methylallyl)FeI(CO)$_3$
(Cinnamaldehyde)Fe(CO)$_3$
(Cinnamaldehyde)Fe(CO)$_4$
(Acrylonitrile)Fe(CO)$_4$
(Maleic anhydride)Fe(CO)$_4$
(Methyl methacrylate)Fe(CO)$_4$
(Butadiene)Fe(CO)$_4$
(Ethylene)Fe(CO)$_4$ (Vinylcycloheptatriene)Fe$_2$(CO)$_6$
(Hexatriene)Fe$_2$(CO)$_6$
(Cyclooctatetraene)Fe$_2$(CO)$_6$
(Acenaphthylene)Fe$_2$(CO)$_6$
(m-Divinylbenzene)Fe$_2$(CO)$_6$
(p-Divinylbenzene)Fe$_2$(CO)$_6$
(Azulene)Fe$_2$(CO)$_5$
Bis(cyclopentadienyl)Fe$_2$(CO)$_4$ A fourth class of suitable iron precursors, as mentioned, are iron nitrosyls such as dinitrosylcarbonyl iron, Fe(NO)$_2$(CO)$_2$.

If the selected iron precursor is a liquid, it can be added directly to the reaction mixture in the appropriate increments, as shown in many of the examples which follow. On the other hand, if the iron precursor is a solid, it may first be dissolved in a small amount of a suitable solvent for incremental addition as in Example 7, or it may be added as a powder with, for example, a powder dosing funnel as in Example 10.

As has been mentioned, and as will be seen from the examples, the iron precursor should be added incrementally at suitable time intervals. As already indicated, the reason for this incremental addition is that two separate reactions can occur simultaneously. First, if too much iron precursor is added, some of it remains in solution, where it can decompose slowly. Decomposition of the unbound iron precursor is undesirable and should be minimized. Second, the preferred reaction is decomposition of the polymer-bound iron species, and the incremental addition and the rate thereof should be adapted to favor this reaction.

As a minimum first increment of iron precursor, an amount of precursor may initially be added which is just enough to saturate all of the active binding sites on the active polymer. However, it is preferred to add an excess of precursor up to about 5 to about 10 moles of iron precursor per mole of active sites, this preference existing because the excess unbound iron precursor does not decompose very readily compared to the polymer-bound iron precursor, and the excess is desirable to be readily available to react at the sites at which decomposition reaction has occurred, to facilitate nucleation and particle growth.

The subsequent increments are added based upon monitoring the evolution of carbon monoxide which occurs as a result of the decomposition of the iron precursor. When little carbon monoxide is being generated from the reaction mixture, it is apparent that the iron precursor present in the reaction mixture has substantially decomposed. Thus, it is desirable to wait until only a little or no carbon monoxide is being generated, then add another increment of up to about 5 to about 10 moles excess, and so on, until the addition of the final increment. Typically, it has been found that it is desirable to wait for a period of about 2 to about 4 hours between increments, depending upon the reaction rate, which is a function of the reagents, solvent, temperature and other conditions.

After the last increment has been added, it is generally convenient to continue heating, for example, for about 24 hours to evolve the last traces of carbon monoxide, indicating substantially total completion of the desired reaction. Of course, it is possible to add increments less frequently than indicated above. On a production basis, it would be preferred to add the iron precursor continuously at a rate determined to be sufficient to compensate for the consumption of the iron precursor in the reaction vessel, which is basically a continuous incremental addition.

The maximum amount of iron precursor which can effectively be added to the dispersion is determined experimentally by the point at which the total iron concentration in the dispersion can no longer be increased significantly. Immediately following particle nucleation, the particle size is at a minimum in any given system. One can discontinue adding addition iron precursor when the desired particle size has been achieved. If the aforementioned maximum amount of iron precursor is exceeded, undesirable results such as wider particle size ranges and precipitation of the colloidal dispersion ensue.

Turning now to a consideration of solvents which are suitable for preparing the colloidal iron dispersions of the instant invention, suitable solvents must be inert in the sense that they do not react with the iron precursor, nor with the polymer, and, of course, not with the resulting iron dispersion. The solvent must be capable of dissolving the active polymer, preferably at about ambient temperature, or slightly above for convenience, and necessarily at the reaction temperature. It should likewise be a good solvent for the iron precursor, prefeably at about ambient temperature, and necessarily at the reaction temperature. Thus, practically speaking, the choice of a suitable solvent depends upon the iron precursor employed and the polymer employed, with due regard to the solubility and reactivity of these materials. A wide variety of inert solvents may be employed. Some solvents which have been found to be particularly useful include the following: (1) benzene and alkyl derivatives thereof such as monoalkylbenzenes and dialkylbenzenes; (2) halogenated derivatives of benzene such as chlorobenzene, o-dichlorobenzene, and p-dichlorobenzene; (3) straight chain and cyclic hydrocarbons, and particularly alkanes having from about 5 to about 20 carbon atoms, either straight chain or branched, such as decane, octane, hexadecane, pentane, isooctane and neopentane, and cyclic alkanes such as cyclohexane, decalin and tetralin; (4) ethers and alcohols such as tetrahydrofuran, dialkyl ethers, ethyleneglycolmonomethylether, ethyleneglycolmonoethylether, butanol, hexanol and cyclohexanol; (5) esters such as alkylacetates, alkylpropionates and alkylbutyrates; and (6) ketones such as cyclohexanone, mesityl oxide, etc.

There is no particular upper limit on the boiling point of the solvent selected, but there is a practical lower limit, that being the temperature at which thermal decomposition of the polymer-bound iron precursor will proceed at the pressure employed. Concerning the melting point of the solvent, it must be a liquid at the reaction temperature of the thermal decomposition of the polymer-bound iron precursor, and it should preferably be liquid at ambient temperature or slightly above ambient temperature to facilitate making the reaction mixture and subsequent processing of the resulting dispersion after the reaction is complete.

The amount of solvent to be employed depends primarily upon the active polymer which is selected, and more particularly, upon the molecular weight thereof, bearing in mind that the concentration of the active polymer in the solvent solution must be below the critical entanglement concentration for the polymer molecules, so that each polymer molecule is a discrete, individual, isolated domain, not entangled with any other polymer molecules. As a practical matter, the lowest molecular weight polymer which would ordinarily be used would have a molecular weight of about 1,000, so as to be capable of forming sizable discrete domains. With such a low molecular weight active polymer, it is possible to use about 10 percent or more by weight of polymer based upon the weight of the solvent, based upon the critical entanglement concentration. Of course, one may use more solvent than the required minimum, if desired. As a practical matter, the maximum molecular weight of the active polymer which may ordinarily be used is about 1 million, and with such a high molecular weight polymer, a maximum polymer concentration of about 0.5 percent by weight based upon the weight of the solvent may be used; typically, with such high molecular weight polymers, the polymer concentration which is generally preferred may range from about 0.2 percent to about 0.5 percent by weight based upon the weight of the solvent, again, the limit being based upon the critical entanglement concentration. The molecular weight of the active polymer which is selected is chosen primarily with regard to the size of the colloidal iron particles desired; the higher concentrations of lower molecular weight range polymers will produce relatively small particles, whereas lower concentrations of higher molecular weight polymers will tend to yield larger colloidal particles. Typically, the molecular weight of the active polymers which have been used ranges from about 10,000 to about 100,000, in which case, the typical concentration of the active polymer in the solvent ranges, respectively, from about 5 percent down to about 2 percent by weight based upon the weight of the solvent.

Concerning the reaction temperature, the solution of active polymer and iron precursor is heated at a temperature at which the polymer-bound iron precursor decomposes to iron at a much more rapid rate than any unbound free iron precursor which may be in the solution decomposes. In practice, a suitable temperature range is from about 100° C. to about 170° C. for most systems, and the preferred temperature range for most systems is from about 130° C. to about 150° C. The optimal temperature for any given system may readily be determined simply by comparing the rate of carbon monoxide evolution from the system with and without the presence of the active polymer; at the optimum temperature, significant carbon monoxide evolution will occur readily in the presence of the active polymer but not readily in the absence of the active polymer. It is generally preferable to use the minimum temperature that will give a significant rate of decomposition of the polymer-bound iron precursor to iron, since this also tends to minimize solution phase decomposition. The optimum temperature varies with the system and, as mentioned, is best simply determined experimentally. It is generally preferred to conduct the reaction at atmospheric pressure for convenience, although the reaction will proceed at a pressure above or below atmospheric pressure, which would, in turn, influence the boiling point of the selected solvent. The solvent, of course, must have a boiling point which is at least as high as the desired reaction temperature at the pressure employed. It is useful to select a solvent having a boiling point, at the pressure employed, such that the reaction may be carried out at reflux temperature, this being useful in that it assists the evolution of carbon monoxide. However, it is possible to operate at temperatures below reflux temperature.

As mentioned, the reaction should be carried out in an inert atmosphere, that is, inert in the sense that the atmosphere does not cause any adverse reactions in the system, either with respect to the solvent, the active polymer, the iron precursor or the product. While argon is conveniently used in the examples which follow, other inert atmospheres may be employed such as nitrogen, neon and helium, or the reaction may be carried out in a vacuum with sufficiently high boiling solvents and iron precursors.

It is to be particularly noted that the polymer is both a reactant and a catalyst for the decomposition of the iron precursor; it is not an inactive component which merely serves to stabilize independently nucleated particles.

The following examples are intended to illustrate, and not to limit, the scope of the instant invention.

EXAMPLE 1

This example illustrates the preparation of a colloidal dispersion of iron particles prepared with copoly(styrene/4-vinylpyridine)(1/0.05)molar as the active polymer.

4.65 g. of copoly(styrene/4-vinylpyridine)(1/0.05) molar having a styrene equivalent number average molecular weight of about 10,140 and a molecular weight distribution of about 1.92 is dissolved in 250 g. of water-free o-dichlorobenzene at room temperature in a 500 ml. 4-neck round bottom flask. This represents a 1.8 weight percent polymer solution. The flask is equipped with a paddle stirrer, a thermometer long enough to have its bulb immersed in the liquid, a reflux condenser, and a combined gas inlet and rubber serum cap for introducing an inert atmosphere and reactants and to permit sampling the reaction mixture with a hypodermic syringe and needle. The reflux condenser is vented to the atmosphere through a drying tube containing a dessicant. The lower portion of the flask is immersed in a mineral oil bath as a heat source.

In preparation of the introduction of the iron precursor, iron pentacarbonyl, the solution in the flask is heated to 145° C. and the system is thoroughly purged with argon overnight for about 16 hours with the temperature being maintained at 145° C. 38 g. of iron pentacarbonyl is added in ten 3.8 g. increments, maintaining a continuing argon flow and constant stirring. The increments are added every 2.5 hours. After adding the last increment, heating is continued for about 24 hours until the iron pentacarbonyl has been completely decomposed, as conveniently determined by the absence of iron-carbonyl bands near 2,000 cm$^{-1}$ in the infrared spectrum of the dispersion. The dispersion is cooled to room temperature, and, under an inert atmosphere of argon, the dispersion is filtered to remove any large particles of iron or precipitated polymer, that is, anything flocculent. The filtration is carried out under pressure through a pad filter having pores of 2–4 microns and the filtrate is then bottled under argon in serum bottles for retention and further testing. The resultant dispersion is strongly ferromagnetic, having a magnetization of 130 emu/g. of iron at 10 KiloOestads (KOe), and exhibits a slight time dependent hysteresis. The dispersion contains 1.75% iron by weight and 1.25% polymer by weight, the iron particles being bound to the polymer molecules. The dispersion is comprised of particles ranging from about 140–160 Angstrom units in diameter.

The magnetization is measured in order to assess the degree to which oxygen has been successfully excluded from the reaction system. Dispersions which show no oxide lines in their electron diffraction patterns typically exhibit magnetization values of about 120 to about 170 emu/g. of iron. at 10 KOe. Extensive oxidation will lower the magnetization. Relatively high magnetization values are particularly useful in the preparation of magnetic xerographic developer materials.

The instant invention provides a method for the preparation of a homogeneous, physically stable colloidal elemental iron dispersion, suitable for use as a catalyst, comprising colloidal iron particles having a particle size within the range of from about 10 Angstrom units to about 200 Angstrom units dispersed in an inert liquid and stabilized by the presence of an active polymer to the reactive sites of which the iron particles are bound.

EXAMPLE 2

This example illustrates the preparation of a colloidal dispersion of iron particles prepared with copoly(styrene/4-vinylpyridine)(1/0.1)molar as the active polymer.

The general apparatus and procedure of Example 1 are employed in this example. 37 g. of iron pentacarbonyl is added to a solution of 2.44 g. of copoly(styrene/4-vinylpyridine)(1/0.1)molar having a styrene equivalent number average molecular weight of about 10,000 dissolved in 250 g. of o-dichlorobenzene (representing a 0.97 weight percent polymer solution) in ten 3.7 g. increments, with 2.5 hour intervals between the addition of each increment. The temperature of the solution is 145° C. Following addition of the last increment, the heating is continued for about 24 hours until the iron pentacarbonyl has been completely decomposed, as conveniently determined by the absence of iron-carbonyl bands near 2,000 to cm$^1$ in the infrared spectrum of the resultant dispersion. The resulting dispersion contains 2.03 weight percent iron and 0.36 weight percent polymer. The dispersion is strongly superparamagnetic, exhibiting a magnetization of 82 emu/g. of iron at 10 KOe. The particle size of the colloidal iron in the dispersion ranges from about 70 to about 80 Angstrom units in diameter.

EXAMPLE 3

This example illustrates a colloidal dispersion of iron particles prepared with copoly(styrene/phenylvinylketoxime)(1/0.06)molar as the active polymer. This example also illustrates the nucleation and growth of colloidal iron particles according to the invention.

In order to prepare the copoly(styrene/phenylvinylketoxime) active polymer to be used in the present example, 40 g. of copoly(styrene/phenylvinylketone), obtained from Van Lear Plastics, Inc., Houston, Texas under the tradename Ecolyte S-108, is dissolved in one liter of pyridine in a two liter 4-neck round bottom flask appropriately equipped with a reflux condenser vented to the atmosphere through a drying tube, a paddle stirrer, a thermometer long enough to extend into the liquid in the flask, and an inlet to provide an inert argon atmosphere. An external oil bath containing oil in a sufficient quantity to cover the bottom portion of the flask is employed as the heat source. With continuous stirring of the contents of the flask and with a continuous flow of argon to maintain an inert atmosphere in the flask, 64 g. of hydroxylamine is dissolved in the pyridine, and the temperature of the mixture is raised to reflux temperature (115° C.), these conditions being maintained overnight for about 16 hours. The contents of the flask are then cooled to room temperature and added to an excess of methanol, whereby the desired active polymer is precipitated. The polymer is removed by filtration, washed with methanol, dissolved in methylene chloride and reprecipitated by adding the solution to an excess of methanol. The precipitate is filtered, washed with methanol, and vacuum dried at 60° C. A yield of 39 g. of copoly(styrene/phenylvinylketoxime)(1/0.06)molar is obtained.

For the preparation of a colloidal dispersion of iron in accordance with the present invention, the general apparatus and procedure of Example 1 are employed. The flask is charged with 4.0 g. of copoly(styrene/phenylvinylketoxime)(1/0.06)molar copolymer dissolved in 200 ml. of water-free o-dichlorobenzene at room temperature. This represents a 2.0 weight percent polymer solution. The atmosphere in the flask is purged with argon overnight for about 16 hours. In preparation for the introduction of the iron precursor, iron pentacarbonyl, which is a liquid, the solution in the flask is heated to 140° C., and thereafter, the temperature is maintained at 140° C. throughout the ensuing reaction, and the atmosphere is constantly purged with argon throughout the reaction. Constant stirring of the reaction mixture is maintained. A total of 35.75 g. of iron pentacarbonyl is added to the contents of the flask in ten 3.575 g. increments, adding one increment every 2.5 hours. 2.5 hours after the addition of the 2nd, 4th, 6th, 8th and 10th increments, 1 ml. samples are withdrawn from the flask and examined by transmission electron microscopy to observe whether any iron particles are present and what their size is. 2.5 hours after the addition of the 2nd increment, no particles are visible by transmission electron microscopy. Two and ½ hours after the addition of the 4th increment, numerous particles are observed, being about 75–100 Angstrom units in diameter, the particles being substantially iron. Two and ½ hours after the addition of the 6th increment, the iron particles have grown to a size of about 90–120 Angstrom units in diameter. The iron particles then remain in the same size range 2-½ hours after the 8th increment is added. 2.5 hours after the addition of the 10th increment, the dispersion contains iron particles having a size range of about 140–160 Angstrom units in diameter. After addition of the 10th increment, heating is continued for about 24 hours to effect complete decomposition of the iron pentacarbonyl as determined by the absence of iron-cabonyl bands near 2000 cm$^{-1}$ in the infrared spectrum of the resulting colloidal iron dispersion.

In addition to monitoring the reaction by transmission electron microscopy, the reaction is also monitored by measuring the evolution of carbon monoxide. Based upon these measurements, it appears that, during the reaction of the 2nd increment, nucleation occurs; this phase of the reaction apparently involves zero order kinetics, that is, the reaction proceeds independently of the concentration of iron pentacarbonyl.

The resultant dispersion is cooled to ambient temperature (about 25° C.) and the dispersion is filtered under pressure under an inert atmosphere of argon through a pad filter having pores of 2–4 microns, the filtration being carried out as a precaution to remove any large particles of iron or precipitated polymer, that is, anything flocculent. The dispersion is then bottled under an argon atmosphere in serum bottles for retention and further testing.

The resultant iron dispersion is ferromagnetic, exhibits a slight time-dependent hysteresis, and a magnetization of 32 emu/g. of iron at 10 KOe. The dispersion contains 4.37% of iron by weight and 0.33% polymer by weight, the iron particles being bound to the polymer molecules, the dispersion comprising particles ranging from about 140–160 Angstrom units in diameter.

EXAMPLE 4

This example illustrates the use of a colloidal iron dispersion according to the invention as a catalyst.

A colloidal iron dispersion prepared as in Example 2 is used to catalyze the hydroformylation of 1-hexene as follows. White constantly maintaining an inert atmosphere of argon, 100 g. of the dispersion is diluted to 500 ml. with chlorobenzene in a one liter capacity autoclave, and 86 g. of 1-hexene is added. The autoclave is closed and the argon is removed and replaced with a mixture of equal parts by volume of carbon monoxide and hydrogen. The temperature of the mixture is raised to 100° C., then the pressure in the autoclave is increased to 42 atmospheres with a 1:1 volume mixture of carbon monoxide and hydrogen, and the temperature and pressure are maintained for 4 hours. The pressure is then released and the reaction mixture is blanketed with an atmosphere of argon, then cooled to ambient temperature. A sample of the product of the reaction is removed and subjected to gas chromatographic analysis, which shows that 20% of the 1-hexene is converted to normal and iso heptaldehydes. The ratio of normal heptaldehyde to iso heptaldehyde is about 2:1 by weight.

EXAMPLE 5

This example illustrates the preparation and use of a supported colloidal iron particle catalyst according to the invention by means of suspension polymerization.

100 g. of colloidal iron dispersion prepared substantially as in Example 2 is vacuum concentrated at 70° C. to 50% by weight of nonvolatile material. To the concentrate is added 150 g. of styrene monomer and 2 g. of divinylbenzene monomer, resulting in a dispersion of the colloidal iron particles in the solution of the two monomers. 1.5 g. of stearic acid as a lubricant and 1.5 g. of azobisisobutyronitrile as a polymerization initiator in solution are dissolved in the dispersion.

A 2-liter round bottom flask equipped with a stirrer, reflux condenser and argon inlet is provided, with an oil bath as a heat source. Into the flask is introduced 500 ml. of deionized water, 0.1 g. of sodium lauryl sulfate as a surfactant, 1.5 g. of sodium polyacrylate as a dispersant and protective colloid, and 5 g. of sodium sulfate. After heating the contents of the flask to 80° C., the colloidal iron dispersion containing the monomers is added and the mixture is stirred vigorously at 80° C. for 4 hours under a constant argon atmosphere. During the 4 hour period, the styrene and divinylbenzene are polymerized to yield beads of cross-linked polystyrene of the order of 1 mm. in diameter containing 1.35 weight percent of iron particles having a diameter of about 70–80 Angstrom units. The reaction mixture is cooled to room temperature, filtered, and the product catalyst beads are vacuum dried at 60° C. to yield about 140 g. of the supported catalyst.

The catalyst prepared as above is used to catalyze the hydroformylation of 1-hexene as follows. While constantly maintaining an inert atmosphere of argon, 150 g. of catalytic beads is slurried in 500 ml. of cyclohexane in a one liter capacity autoclave, and 86 g. of 1-hexene is added. The autoclave is closed and the argon is removed and replaced with a mixture of equal parts by volume of carbon monoxide and hydrogen. The temperature of the mixture is raised to 100° C., then the pressure in the autoclave is increased to 42 atmospheres with a 1:1 volume mixture of carbon monoxide and hydrogen, and the temperature and pressure are maintained for 4 hours. The pressure is then released and the reaction mixture is blanketed with an atmosphere of argon, then cooled to ambient temperature. A sample of the product of the reaction is removed and subjected to gas chromatographic analysis, which shows that 60% of the 1-hexene is converted to normal and iso heptaldehydes. The ratio of normal heptaldehyde to iso heptaldehyde is about 2:1 by weight.

As illustrated by Example 5, the invention provides a method for the preparation of a bead-supported catalyst comprising colloidal iron particles having a particle size within the range of from about 10 Angstrom units to about 200 Angstrom units, said particles being bound to the reactive sites of an active polymer, and said particles and active polymer being supported in the beads, said method comprising supporting a liquid-dispersed colloidal elemental iron catalyst in beads, said beads being produced by suspension polymerization of at least one polymerizable monomer.

EXAMPLE 6

This example illustrates the preparation of colloidal iron particle dispersions having a relatively low particle size range, using copoly(styrene/N-vinylpyrrolidone)(1/0.37)molar as the active polymer.

3.19 g. of copoly(styrene/N-vinylpyrrolidone)(1/0.37)molar is dissolved in 250 ml. of chlorobenzene (representing a 1.27 weight percent polymer solution) in a 500 ml. 4-neck flask equipped as in Example 1. 39.2 g. of iron pentacarbonyl is added in twenty 1.86 g. increments 2.5 hours apart with constant stirring, the temperature being maintained at 132° C., and an inert atmosphere being maintained. The temperature and inert atmosphere are maintained for about 24 hours after the addition of the last increment at which point no iron-carbonyl bonds could be detected. The resultant colloidal iron dispersion comprises 0.60 weight percent iron and 0.18 weight percent polymer, the iron particles having a size range of about 10-60 Angstrom units. The dispersion is strongly superparamagnetic, exhibiting a magnetization of 138 emu/g. of iron at 10 KOe.

Depending upon the amounts of polymer and iron precursor employed, colloidal iron dispersions according to the invention, with the iron particles bound to the polymer molecules, may be prepared having a weight ratio of iron to polymer within the range of from about 10:100 to about 90:10.

EXAMPLE 7

This example illustrates diiron nonacarbonyl as the iron precursor. A reaction is carried out using essentially the same apparatus and process conditions as set forth in Example 1 in general, except that diiron nonacarbonyl is used as the iron precursor. Since this precursor is a crystalline solid, 33.20 g. of diiron nanocarbonyl is first conveniently dissolved in 50 ml. of o-dichlorobenzene. This solution is added to a solution of 4.0 g. of copoly(styrene/phenylvinylketoxime)(1/0.06)molar dissolved in 150 ml. of o-dichlorobenzene (representing a 1.6 weight percent polymer solution) in 10 equal increments at intervals of 2.5 hours, followed by heating for about 24 hours following addition of the last increment. The resultant product is a colloidal dispersion of iron particles having a particle size range of about 100-150 Angstrom units. The dispersion contains 3 weight percent iron and 1.4 weight percent polymer. The dispersion is strongly superparamagnetic, having a magnetization of 120 emu/g. of iron at 10 KOe.

EXAMPLE 8

This example illustrates the use of 1,3-butadiene iron tricarbonyl as the iron precursor. A reaction is carried out substantially as set forth in Example 1, except that the liquid, 1,3-butadiene iron tricarbonyl, is used in a total amount of 35.4 g. as the iron precursor, this total being added in 10 approximately equal increments at intervals of 2.5 hours, with a final heating period of about 24 hours. The resulting stable colloidal iron dispersion contains colloidal iron particles having a size range of about 80-120 Angstrom units. It contains 3.2 weight percent iron and 1.8 weight percent polymer. The dispersion is strongly superparamagnetic, having a magnetization of 110 emu/g. of iron at 10 KOe.

EXAMPLE 9

This example illustrates the use of diethyleneglycoldiethylether as the solvent. A reaction is carried out substantially in accordance with Example 1, except that the solvent o-dichlorobenzene employed in Example 1 is replaced by 200 ml. of diethyleneglycoldiethylether. All other conditions and materials and apparatus are essentially the same as in Example 1. The resulting stable colloidal iron suspension contains colloidal iron particles having a size range of about 80-100 Angstrom units, and contains 3.5 weight percent iron and 1.5 weight percent polymer. The dispersion is strongly superparamagnetic having a magnetization of 125 emu/g. of iron at 10 KOe.

EXAMPLE 10

This example illustrates the use of triiron dodecacarbonyl as the iron precursor.

A reaction is carried out substantially as set forth in Example 1, but using diethyleneglycoldiethylether as the solvent. The other conditions and apparatus are substantially as set forth in Example 1. A total of 32.0 g. of triiron dodecacarbonyl, which is a solid, is added to the reaction mixture through a powder dosing funnel in 10 approximately equal portions.

The resulting stable colloidal iron dispersion contains colloidal iron particles having a size range of about 100-150 Angstrom units, and contains 2.5 weight percent iron and 1.2 weight percent polymer. The dispersion is strongly superparamagnetic, having a magnetization of 120 emu/g. of iron at 10 KOe.

EXAMPLE 11

This example illustrates the use of copoly(styrene/diphenyl-parastyrylphosphine oxide)(1/0.1)molar as the active polymer. A reaction is carried out substantially as set forth in Example 1 with respect to the apparatus and conditions, except as follows. 5 g. of copoly(styrene/diphenyl-para-styrylphosphine oxide)(1/0.1)molar is dissolved in 250 g. of dry ethyleneglycoldiethyether. This represents a 2.0 weight percent polymer solution. The temperature is brought to 140° C. and maintained there during the assembly reaction. A total of 45.5 g. of iron pentacarbonyl in 15 increments of 3.03 g. each is added, the increments being added about 2.5 hours apart, with continued heating for about 24 hours after the addition of the final increment. The resulting stable colloidal iron dispersion contains colloidal iron particles having a size range of about 80-100 Angstrom units in diameter. The dispersion contains 5.0 weight percent iron and 1.5 weight percent polymer. The dispersion is strongly superparamagnetic, having a magnetization of 120 emu/g. of iron at 10 KOe.

EXAMPLE 12

This example illustrates the use of copoly(styrene/4-vinylpyridine-N-oxide)(1/0.05)molar as the active polymer. A reaction is carried out which is substantially the same as Example 11, except that copoly(styrene/4-vinylpyridine-N-oxide)(1/0.05)molar is used as the active polymer instead of the polymer employed in Example 11. The stable colloidal iron dispersion resulting from this run has colloidal iron particles having a size range of about 100-130 Angstrom units, and contains 4.2 weight percent of iron and 1.0 weight percent of polymer. The dispersion is strongly superparamagnetic, having a magnetization of 125 emu/g. of iron at 10 KOe.

Although the invention has been described herein with reference to various preferred embodiments, it is to be understood that variations and modifications may be resorted to as will be apparent to those skilled in the art. Such variations and modifications are to be considered within the purview and the scope of the claims appended hereto.

For example, it is usual to add the polymer to the solvent and dissolve it as the first step, at room temperature, or at some higher temperature which may be as high as the temperature at which the reaction is to occur. However, this procedure could be varied, for example, by adding the first increment of the iron precursor to the solvent first, and then dissolving the polymer in the solvent, subsequently heating to the reaction temperature. It is also possible, during the raction, to add more polymer to provide additional reactive sites to increase the number of iron particles in the system. Also, additional polymer, over and above the earlier-mentioned approximately 10 percent or more maximum, may be added at the end of the reaction to enhance the stability of the dispersion, depending upon the intended purpose for the dispersion. It may be preferred to use two different polymers, one being inert and the other being active; the inert polymer would typically, but not necessarily, be added after nucleation, and serves to enhance the stability of the resulting dispersion. One may, of course, use a plurality of iron precursors, suitably adjusting the conditions. If it is planned to conduct a continued series of reductions using the same materials, it is possible to make a master nucleated batch of polymer-bound iron precursor for subsequent use as desired.

As another possible variation, the decomposition of the polymer-bound iron precursor, while preferably and most conveniently effected by heat, may also be effected by other stimuli such as actinic radiation.

Referring to the examples, all of the active polymers used are copolymers, but while this is preferably, it is not essential. Any suitable homopolymer containing active sites may be used. Preferably, however, it is desirable to copolymerize the monomer of the active moiety with an inert monomer, so that the inert moieties in the polymer chain reduce the number of active binding sites in the entire chain, the polymer thus containing moieties having some reactive sites and also moieties not containing reactive sites. Preferably, when a copolymer is employed, the copolymer contains less than about 10 mole percent of the active moieties. Desirably, copolymers may be prepared by polymerization of vinyl type monomers. Desirably, the inert monomer is selected from the group consisting of styrene, ethylene, methylmethacrylate and vinylacetate and the active monomer is selected from the group consisting of 2-vinylpyridine, 4-vinylpyridine, N-vinylimidazole, 2-vinylimidazole, 4,5-vinylimidazole, acrylonitrile, methacrylonitrile, N-vinylphthalimide, N-vinylsuccinimide, dimethylaminoethylmethacrylate, and N-alkylacrylamides.

The colloidal iron dispersions, if stored, should be stored under an inert atmosphere to prevent oxidation of the iron particles and/or other undesirable reactions.

What is claimed is:

1. A method for the preparation of a homogeneous, physically stable colloidal elemental iron dispersion comprising:
   (a) preparing a solution in an inert solvent of an active polymer, the concentration of the polymer being below its critical entanglement concentration, to provide discrete reactive binding sites to which iron precursor molecules can become bound;
   (b) incrementally adding, at suitable time intervals, an iron precursor, the molecules of which rapidly become bound to the active sites of the polymer;
   (c) maintaining a temperature which is sufficiently high to decompose the polymer-bound iron precursor much more rapidly than any iron precursor which may remain unbound in the solution;
   (d) continuing the addition of increments of iron precursor to yield colloidal iron particles of the desired size within the range of from about 10 Angstrom units to about 200 Angstrom units, the iron particles being bound to the active polymer molecules;
   (e) steps (b), (c) and (d) being carried out in an inert atmosphere.

2. A method as set forth in claim 1 wherein the final increment, after decomposition, yields colloidal iron particles having a maximum size of about 150 Angstrom units.

3. A method as set forth in claim 1 wherein the final increment, after decomposition, yields colloidal iron particles, some of which have a maximum size of about 120 Angstrom units, the resulting dispersion being superparamagnetic.

4. A method as set forth in claim 1 wherein the iron precursor increments are added in an amount of from about 5 to about 10 moles of iron precursor per mole of reactive binding sites.

5. A method as set forth in claim 1 wherein the iron precursor increments are added when only a little or no carbon monoxide is being generated.

6. A method as set forth in claim 1 wherein the iron precursor increments are added from about 2 to about 4 hours apart.

7. A method as set forth in claim 1 which is carried out at about atmospheric pressure.

8. A method as set forth in claim 1 wherein the addition of increments of the iron precursor is continuous, at a rate sufficient to compensate for the consumption of the iron precursor already added.

9. A method as set forth in claim 1 wherein the sufficiently high temperature is reflux temperature.

10. A method as set forth in claim 1 wherein the sufficiently high temperature is within the range of from about 100° C. to about 170° C.

11. A method as set forth in claim 10 wherein the temperature is within the range of from about 130° C. to about 150° C.

12. A method as set forth in claim 1 wherein the sufficiently high temperature is the minimum temperature that will cause a significant rate of decomposition of the polymer-bound iron precursor.

13. A method as set forth in claim 1 wherein decomposition of the polymer-bound iron precursor is decomposed by actinic radiation instead of heat.

14. A method as set forth in claim 1 wherein additional active polymer is added during the reaction.

15. A method as set forth in claim 1 wherein additional active polymer is added after the reaction is complete.

16. A method as set forth in claim 1 wherein the active polymer is soluble in the inert solvent at about ambient temperature.

17. A method as set forth in claim 1 wherein the active polymer is a Lewis base.

18. A method as set forth in claim 1 wherein the active polymer is a homopolymer.

19. A method as set forth in claim 1 wherein the active polymer is a copolymer of an active monomer and an inert monomer.

20. A method as set forth in claim 19 wherein said copolymer contains less than about 10 mole% of active moieties.

21. A method as set forth in claim 19 wherein said copolymer is prepared by polymerization of vinyl type monomers.

22. A method as set forth in claim 19 wherein the inert monomer is selected from the group consisting of styrene, ethylene, methylmethacrylate and vinylacetate and the active monomer is selected from the group consisting of 2-vinylpyridine, 4-vinylpyridine, N-vinylimidazole, 2-vinylimidazole, 4,5-vinylimidazole, acrylonitrile, methacrylonitrile, N-vinylphthalimide, N-vinylsuccinimide, dimethlaminoethylmethacrylate, and N-alkylacrylamides.

23. A method as set forth in claim 19, said copolymer being selected from the group consisting of copoly(styrene/vinylpyridine), copoly(styrene/phenylvinylketoxime), and copoly(styrene/N-vinylpyrrolidone).

24. A method as set forth in claim 1 wherein said active polymer has a molecular weight of from about 1000 to about 1 million.

25. A method as set forth in claim 24 wherein the active polymer concentration in the inert solution is, respectively, from about 10 percent or more to about 0.2–0.5 percent by weight based upon the weight of the solvent.

26. A method as set forth in claim 1 wherein said active polymer has a molecular weight of from about 10,000 to about 100,000.

27. A method as set forth in claim 26 wherein the active polymer concentration in the inert solution is, respectively, from about 5 percent to about 2 percent by weight based upon the weight of the solvent.

28. A method as set forth in claim 1 wherein said inert solvent is a liquid at about ambient temperature.

29. A method as set forth in claim 1 wherein said iron precursor is an iron carbonyl.

30. A method as set forth in claim 29 wherein said iron carbonyl is iron pentacarbonyl.

31. A method as set forth in claim 29 wherein said iron carbonyl is diiron nonacarbonyl.

32. A method as set forth in claim 29 wherein said iron carbonyl is triiron dodecacarbonyl.

33. A method as set forth in claim 1 wherein said iron precursor is an iron alkylcarbonyl.

34. A method as set forth in claim 1 wherein said iron precursor is an iron alkenylcarbonyl.

35. A method as set forth in claim 1 wherein said iron precursor is an iron nitrosyl.

36. A homogeneous, physically stable colloidal elemental iron dispersion, suitable for use as a catalyst, comprising colloidal iron particles having a particle size within the range of from about 10 Angstrom units to about 200 Angstrom units dispersed in an inert liquid and stabilized by the presence of an active polymer to the reactive sites of which the iron particles are bound, said dispersion being prepared by the method of claim 1.

37. A dispersion as set forth in claim 36 having a maximum colloidal iron particle size of about 150 Angstrom units.

38. A dispersion as set forth in claim 36 having a maximum colloidal iron particle size of about 120 Angstrom units and being superparamagnetic.

39. A dispersion as set forth in claim 36 wherein the weight ratio of iron to polymer is within the range of from about 90:100 to about 90:10.

40. A method for the preparation of a bead-supported catalyst comprising colloidal iron particles having a particle size within the range of from about 10 Angstrom units to about 200 Angstrom units, sid particles being bound to the reactive sites of an active polymer, and said particles and active polymer being supported in the beads, said method comprising supporting a liquid-dispersed colloidal elemental iron catalyst as set forth in claim 36 in beads, said beads being produced by suspension polymerization of at least one polymerizable monomer.

41. A bead-supported catalyst as set forth in claim 40 wherein the beads comprise cross-linked polystyrene.

* * * * *